United States Patent

[11] 3,567,029

[72] Inventor Babington A. Quame
235 E. 18th St., New York, N.Y. 10003
[21] Appl. No. 853,066
[22] Filed Aug. 26, 1969
[45] Patented Mar. 2, 1971

[54] COLUMN FOR TESTING BIOLOGICAL FLUIDS
7 Claims, 3 Drawing Figs.
[52] U.S. Cl. .................................................. 210/249,
210/262, 210/266, 210/282, 210/284
[51] Int. Cl. ....................................................... B01d 25/06,
B01d 27/02
[50] Field of Search............................................ 210/94,
266, 282, 283, 284, 290, 249, 262

[56] References Cited
UNITED STATES PATENTS
2,761,832  9/1956  Robb et al. ................... 210/290X
3,360,128  12/1967  Federline ...................... 210/94
3,382,983  5/1968  Stewart ......................... 210/290X
3,389,803  6/1968  Barley ........................... 210/266
FOREIGN PATENTS
980,335  1/1965  Great Britain................ 210/94

Primary Examiner—Samih N. Zaharna
Attorney—Steinberg & Blake

ABSTRACT: A column for testing biological fluids. The column includes an upper receiving container for receiving the fluid which is to be tested. The bottom end of the fluid receiving container is open and situated just beneath a fritted glass disc on which there is a body of resin particles, and on the latter body of resin particles there is a body of purified cellulose, so that in this way there will result a maximum adsorption of drugs together with the resin from a biological fluid. Beneath the fluid receiving container is a filtration container having at its upper region an opening communicating with the outer atmosphere so as to release any pressure which otherwise would build up within the filtration container. Within the filtration container is a filtering aid covered with a phase separating paper. Beneath the filtration container, which has a bottom end, is a collecting container which will collect clear organic solvent with pure drugs contained therein, in the case where the column is used for drug abuse testing purposes. The top open end of the receiving container and the bottom open end of the filtration container can be covered with removable closing caps so that the column can be conveniently sent through the mails, for example.

PATENTED MAR 2 1971
3,567,029
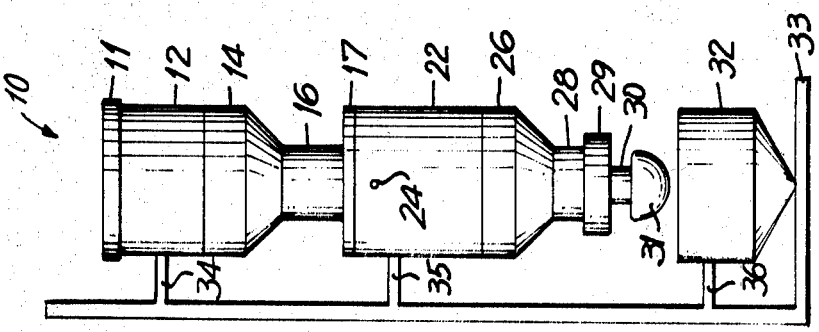
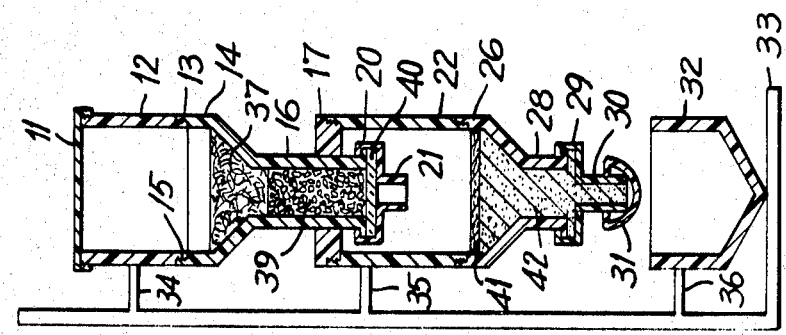
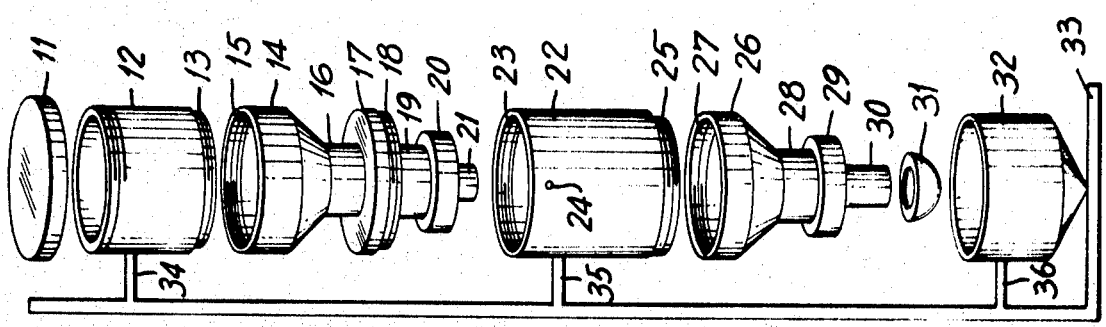
INVENTOR.
BABINGTON A. QUAME
BY
Steinberg and Blake
ATTORNEYS

COLUMN FOR TESTING BIOLOGICAL FLUIDS

This invention relates to a design of a semiautomatic sampling, extracting, and filtering column for screening procedures for detecting drug abuse which can be quantitated by gas or spectrophotometric methods or by thin layer chromatography.

For many years the extraction of biological fluids for clinical diagnosis is almost always based upon an organic solvent system under specific pH condition. This has gone through many difficult problems and developmental changes. Generally, analysis for weak organic acids, organic bases and neutral compounds contained in whole blood or serum, urine, an aqueous standard or stomach content can hardly be accomplished without a pH adjustment. Acidic and neutral drugs are extracted from acidified urine, and basic drugs are extracted from alkaline urine.

Shaking the acidified or basic urine in a buffer-solvent system in order to extract drugs into an organic phase, followed by separate filtration conditions, is a time-consuming and expansive operation.

It is an object of the present invention to design a simple column containing a neutral resin or pure cellulose, or both of these, for collecting a sample and using the same column for eluting the drugs that are absorbed on the column with organic solvent, and collecting at the same time a clear filtered solvent containing acidic, neutral, and basic drugs for clinical analysis.

Another object of the present invention is to provide a small mailable and disposable column which doctors, hospitals, narcotic centers, and probation officers can use in collecting samples for screening for drugs.

An additional object of the present invention is to find a suitable organic solvent that could easily elute the acidic, neutral, and basic drugs from a column without shaking or adjusting the pH of the material in the column with a buffer.

Berti and Cima, Farmaco (Pavia), Ed. Sci. 11, 451 (1956) first reported using amberlite IRC-50 resin to fix phenothiazines and eluting the drugs with 12N sulfuric acid. Bradlow, Steroid, March (1968) pages 215—272 1:1 investigated the extraction of steroid conjugate with amerlite AXD-2. Dole et al., Journal of American Medical Association, 198: 349—352 (1966) reported the detection of narcotic drugs, tranquilizers, amphetamines, and barbiturates in urine with the cation-exchange paper amberlite grade SA-2 (IR-120) using three consecutive buffer-solvent systems ranging in pH from 2.2 to 11. Sunshine, Brinkman Bulletin BR 207, has reported a general procedure for drug analysis by thin layer chromatography using pH adjustment in consecutive solvent systems. Recently, Davidow et al. reported a single organic solvent at pH 9.5 for the extraction of acidic, neutral and basic drugs in urine in The American Journal of Clinical Pathology, Vol. 50, No. 6, pages 714—719 (1968)

In this invention, the immediate objective is to extract directly the maximum amount of the pure drugs from biological fluids through suitable packing media. It is therefore noted that a minumum volume (V) of 10 milliliters of biological fluid such as urine having a concentration (U) of 10 gamma of the drug transported through (P) grams of adsorbing material such as resin or cellulose, or both of these, in a sampling column would deposit a concentration of drug UV/P in the packing material. Thus, increase of UV/P depends upon an increase in UV and the arrangement and type of packing material being used.

The drug abuse column for sampling, extracting, and filtering described in this work takes advantage of the observations and other work reported by previous investigators on the extraction of drugs such as amphetamines, barbiturates, glutethimide, phenothiazines, quinine, codeine, and morphine. Without adjustment of pH or shaking a column packed with a fritted glass disc, an adsorbing resin amberlite AXD-2 and pure cellulose; phase separating paper, and a filtering aid can be eluted with organic solvent and at the same time filters the organic solvent containing pure acidic, neutral, and basic drugs for analysis of over 100 samples in less than an hour, using a series of such columns.

The objective of the present invention is to develop a packing media suitable for drug abuse column which can be used for quick sampling, extracting and filtering of acidic, neutral, and basic drugs from urine. The packed column can be produced, manufactured, packaged, and sole in large quantities to hospitals, probation officers, and narcotic centers at a comparatively low cost, and can be mailed conveniently to any laboratory after a sample has been passed through the packed column for drug analysis.

Still other objectives, benefits, and advantages of the present invention will become evident from a study of the following detailed description, taken in conjunction with this work, in which:

FIG. 1 is a drawing showing the various parts of a column for quick sampling, extracting, and filtering of acidic, neutral, and basic drugs from biological fluids.

FIG. 2 is a cross section of a column showing an arrangement of the packed media for the absorption of drugs from biological fluids.

FIG. 3 is a perspective drawing showing a front view of the column for the extraction of acidic, neutral, and basic drugs from biological fluids.

Referring now specifically to the drawing, a column 10 for quick sampling, extracting, and filtering of acidic, neutral, and basic drugs from biological fluids consists of vertically arranged tubes and carefully packed with media connected together for the extraction of drugs.

The tubes of a column 10 are made of organic resistant material such as polypropylene or its equivalent. The device is provided with a closing cap 11 and a hollow fluid filling chamber 12. At the lower base of this chamber a male connector 13 is provided. This member connects to a head of a resin cellulose chamber 14 to form one piece.

The head of the resin and cellulose chamber 14 has a large opening 15 with a narrow tube 16 which extends through a large base 17. Member 17 is provided with a male connector 18, a narrow tube 19, and a delivery head 20 and a tip 21. Member 18 connects a female acceptor 23 of a filtration storage tank 22.

Member 22 is identical to member 12 except that a small pressure releasing hole 24 is provided at the upper side of the tank. The bottom side of member 22 is provided with a male connector 25 which connects to a female acceptor 27 at a head of a filtration chamber 26.

Member 26 is identical to member 14 except that it has no large base but a delivery head 29 having a tip 30 which is identical to member 21 and it is provided with a closing cap 31.

In packing column 10, members 12 and 22 are separated from the head of the resin and cellulose chamber 14. A small fritted glass disc 40, or its equivalent, having the same diameter as that of member 19 is placed inside of member 20 before this member is attached to the end of member 19. This locks member 40 between 19 and 20. On top of the fritted glass disc inside member 19 a small amount of resin amberlite AXD-2, 39 or its equivalent (usually weighing 1.5 grams) is added. This is followed by a purified cellulose 37 from plantain or its equivalent (weighting 0.2 gram) to hold the resin in place, and at the same time to give a maximum absorption of drugs together with the resin from a biological fluid.

This done, the hollow fluid filling chamber 12 is connected permanently to member 14. Since a resin amberlite AXD-2 contains organic throw due to some residual monomer in the copolymer heads which can interfere with some drugs, several volume of 1:1 methyl alcohol chloroform are passed through member 12 to be followed by distilled water, and vacuum drained. Such pretreatment is desirable in removing the residual monomer present in the packed column.

When packing the filtration unit system, the head of the filtration chamber 26 is separated from the filtration storage tank 22. A piece of filtering aid 42, made of plantain cellulose or its equivalent, is held inside the narrow tube 28 to a level flush at the large opening floor at member 27. This done, a small disc of phase separating paper 41 (Whatman type $$I_s^p$$

or its equivalent) having the same diameter as that of member 27 is added. Member 41 should make a direct contact with the filtering aid 42 before a filtration storage tank 22 is connected permanently to the head of the filtration chamber 26 to lock member 41 in place.

The operation of column 10, as shown in the drawing, will now be readily understood.

A closing cap 11 is removed from the hollowed fluid filling chamber 12, and the head of the resin and cellulose chamber 14 is connected to this member. This unit is held in a special tray or a clamp 33 having supporters 34—36. Several volumes of 1:1 methyl alcohol chloroform are passed through the column to be followed by distilled water and vacuum drained to remove residual monomer present in the resin amberlite AXD-2 in the packed column. A control urine sample containing 10 ug. each of morphine, codeine and quinine per 10 milliliters, and 50 ug. each of amphetamine, pentabarbital, phenobarbital, phenothiazine, and Glutethemide in the same urine is passed through the unit through gravity flow (usually 2—3 minutes) and analyzed in the same way as an unknown sample.

After percolation, if the sample is to be mailed, caps 11 and 31 are connected respectively to members 12 and 21, and the sampling unit, together with its filtration system, is sent to a laboratory for extraction and detection of the drugs.

At the laboratory, the enclosing caps 11 and 31 are removed. A male connector 18 is connected to a female acceptor 23 to join the two-unit systems together. The system is held in a special tray or a clamp 33. Twenty milliliters of organic solvent (1:10 methyl alcohol chloroform, using chloroform washed in a buffer solution made of ammonium hydroxide and ammonium chloride saturated solution at ph 9.5) and added to the hollowed fluid filling chamber 12 to serve as an extractor, under gravity flow (12—15 minutes) to elute any absorbed drugs on the resin and the cellulose packing into the filtration storage tank 22 which is provided with a pressure releasing hole 24.

Since a disc of phase separating paper 41 acts as a combined filter, the phase separator and the pressure releasing hole 24 prevents an aqueous phase from passing through a phase separating paper 41 into member 42 until the organic solvent is completely filtered into the collecting tube 32. However, a faulty packing of the filtration system or absence of the pressure releasing hole 24 would allow the aqueous phase to pass into the filtering aid 42. If this happens, member 42, which is made of plantain cellulose or its equivalent, would absorb the aqueous phase and allow only an organic solvent to enter into the collecting tube 32, or it can be refiltered. Clear organic solvent collected into tube 32 contains pure drugs as amphetamines, glutethimide, phenotheazines, codeine, quinine, and morphine.

Quantitatively these drugs could be made by spectrophotometric or gas chromatographic procedures. Qualitatively, the organic solvent is evaporated to dryness on a steam bath. A residue at the tip of collecting tube 32 is dissolved with 0.025 milliliters of methyl alcohol. The tube is rotated to wash the sidewalls at the bottom of the tube, and allowed to settle. The whole alcohol at the tip of the tube is transferrd to a thin layer plate with disposable capillary tube (usually 4—5 applications). The analysis is finished by Davidow and coworkers by using a thin layer chromatographic screening procedure for detecting drug abuse. (The American Journal of Clinical Pathology, Vol. 50, No. 6, Dec. 1968)

It can now be recognized that by special arrangement of tubes and packing media quick sampling of drugs from biological fluids could be absorbed on a resin or on cellulose from plantain, or their equivalent, or both of these, in a tube. By special arrangement, the drugs can be eluted with organic solvent, extracted and filtered in a one-step operation for screening procedures for detecting drugs abuse which can be quantitated or qualitated.

While the invention has been described with particular reference to the packing of a column for quick sampling, extracting, and filtering of drugs for screening, as shown in a drawing sheet, and as various changes can be made in the details of construction and packing, it should be understood that such changes and packing should be in the spirit and scope of the present investigation as defined by the appended claims.

It will thus be seen that the column of the invention has an upper fluid receiving container formed by the components 12 and 14. The bottom of this fluid receiving container is open and covered by the fluid-permeable disc 40 which is the illustrated example is made of fritted glass. Above the fluid-permeable disc 40 there may or may not be the resin particles 39, but in any event there will be the purified cellulose 37 which in the illustrated example is plantain. Beneath the above fluid receiving container is a filtration container formed by the components 22 and 26 an having the upper opening 24 so that pressure cannot build up within the filtration container. The space for receiving the fluid from the receiving container terminates at its bottom end in the phase separating paper 41 beneath which is the filtering aid 42. Thus the clear organic solvent which contains the pure drugs, in the case of drug abuse testing, will collect in the tube 32. As pointed out above, the removable caps 11 and 31 may be provided to the column elements to close the latter for the purposes of sending through the mails, for example.

I claim:

1. A column for testing biological fluids, comprising an upper fluid receiving container having a top open end through which fluid is to be tested enters the container and a bottom open end through which the fluid leaves the container, said container having in the region of its bottom open end a fluid-permeable disc and above the latter an absorbing body selected from the group consisting of amberlite AXD-2 resin, plantain cellulose and both said amberlite and said cellulose, and a filtration container situated beneath said fluid receiving container to receive the fluid from the latter, said filtration container having an upper end region formed with an opening communicating with the outer atmosphere so that pressure will not build up within said filtration container, and said filtration container having a bottom open and and a lower interior region provided with a cellulose filtering aid with a phase separating layer situated on said filtering aid, so that after passing through said filtration container the liquid to be tested can be collected in a suitable collecting container.

2. The combination of claim 1 and wherein said fluid-permeable disc is fritted glass.

3. The combination of claim 1 and wherein said absorbing body comprises particles of amberlite AXD-2 resin held in place by a packing of cellulose.

4. The combination of claim 1 and wherein a pair of closure caps are removably mounted on the top open end of said fluid receiving container and on the bottom open end of said filtration container for closing the latter ends so that the containers may be transported, through the mails, for example, with a sample therein to be tested.

5. The combination of claim 1, and wherein said containers are formed of tubular bodies threadedly connected to one another with each container having an upper tubular body of a relatively large diameter and a lower tubular body of a relatively small diameter.

6. The combination of claim 5, and wherein the lower tubular body of small diameter of said upper fluid receiving container extends into the upper region of the upper tubular body of large diameter of the filtration container, a ring surrounding the lower region of said upper container and connected with the top of the lower filtration container, and the latter having at its upper region a wall portion formed with said opening providing communication between the interior of said filtration container and the exterior to prevent build up of pressure therein.

7. The combination of claim 6 and wherein a stand is provided for supporting said column in an upright position, and a collecting container carried by the stand beneath the filtration container to receive liquid therefrom.